(12) United States Patent
Yu et al.

(10) Patent No.: US 9,008,720 B2
(45) Date of Patent: Apr. 14, 2015

(54) METHOD AND SYSTEM FOR SMALL CELL DISCOVERY IN HETEROGENEOUS CELLULAR NETWORKS

(75) Inventors: Yi Yu, Irving, TX (US); Zhijun Cai, Euless, TX (US); Chandra Sekhar Bontu, Nepean (CA)

(73) Assignee: BlackBerry Limited, Waterloo, Ontario (CA)

( * ) Notice: Subject to any disclaimer, the term of this patent is extended or adjusted under 35 U.S.C. 154(b) by 490 days.

(21) Appl. No.: 13/399,625

(22) Filed: Feb. 17, 2012

(65) Prior Publication Data

US 2013/0079049 A1 Mar. 28, 2013

Related U.S. Application Data

(60) Provisional application No. 61/539,333, filed on Sep. 26, 2011.

(51) Int. Cl.
*H04B 7/00* (2006.01)
*H04W 48/16* (2009.01)
*H04W 84/04* (2009.01)

(52) U.S. Cl.
CPC ............ *H04W 48/16* (2013.01); *H04W 84/045* (2013.01)

(58) Field of Classification Search
CPC .................................................... H04W 48/16
USPC ............................ 455/525, 444; 370/338, 252
See application file for complete search history.

(56) References Cited

U.S. PATENT DOCUMENTS

| | | | |
|---|---|---|---|
| 8,059,852 B2 * | 11/2011 | Cheng | 381/384 |
| 2006/0025160 A1 | 2/2006 | Kodali et al. | |
| 2007/0097939 A1 * | 5/2007 | Nylander et al. | 370/338 |
| 2008/0108353 A1 * | 5/2008 | Lee et al. | 455/437 |
| 2009/0093234 A1 | 4/2009 | Cai et al. | |
| 2009/0239533 A1 | 9/2009 | Somasundaram et al. | |
| 2010/0027510 A1 | 2/2010 | Balasubramanian et al. | |
| 2010/0046470 A1 | 2/2010 | Sekiya | |
| 2010/0056145 A1 | 3/2010 | Hashimoto et al. | |
| 2010/0113032 A1 | 5/2010 | Lee et al. | |
| 2011/0044259 A1 | 2/2011 | Nimbalker et al. | |
| 2011/0103249 A1 * | 5/2011 | Kim et al. | 370/252 |

(Continued)

OTHER PUBLICATIONS

PCT Application No. PCT/US12/57109, International Search Report, mailed Dec. 24, 2012, 13 pages.

(Continued)

*Primary Examiner* — Sanh Phu
(74) *Attorney, Agent, or Firm* — Conley Rose, P.C.; J. Robert Brown, Jr.

(57) ABSTRACT

A method and a user equipment in a network having a macro cell and at least one small cell, the method in one embodiment receiving a measurement restriction over a broadcast channel from the macro cell; and applying the restriction for a corresponding measurement at the user equipment. In one embodiment the method includes receiving a small cell list from the macro cell; and measuring at least one of a reference signal receive power and a reference signal received quality based on the received small cell list. The method includes, in one embodiment, receiving a neighboring small cell configurations from the macro cell; and utilizing the received small cell configurations to attach to a small cell. The method includes, in one embodiment, receiving an s-measure offset value over a broadcast channel from the macro cell; and applying the s-measure offset value to an s-measure for neighbor cell discovery.

22 Claims, 11 Drawing Sheets

(56) References Cited

U.S. PATENT DOCUMENTS

| | | |
|---|---|---|
| 2011/0103288 A1 | 5/2011 | Lee et al. |
| 2011/0189998 A1 | 8/2011 | Joo et al. |
| 2011/0250896 A1 | 10/2011 | Takano |
| 2012/0003943 A1 | 1/2012 | Marinier et al. |
| 2012/0015657 A1 | 1/2012 | Comsa et al. |
| 2012/0113812 A1 | 5/2012 | Ji et al. |
| 2012/0113843 A1 | 5/2012 | Watfa et al. |
| 2012/0129536 A1 | 5/2012 | Zou et al. |
| 2013/0017793 A1 | 1/2013 | Henttonen et al. |
| 2013/0017820 A1 | 1/2013 | Drazynski et al. |

OTHER PUBLICATIONS

RP-110438, "New work item proposal for Hetnet Mobility Improvements for LTE", Nokia Siemens Networks et al, Mar. 15-28, 2011, 6 pages.

3GPP TS 36.331 V10.2.0, (E-UTRA);Radio Resource Control (RRC); Protocol specification, 298 pages.

3GPP TS 36.211 V10.3.0, (E-UTRA);Physical channels and Modulation, 105 pages.

3GPP TS 36.304 V10.2.0, (E-UTRA); User Equipment (UE) procedures in idle mode, 35 pages.

Yu, Yi, et al.; U.S. Appl. No. 13/399,541, filed Feb. 17, 2012; Title: Method and System for Small Cell Discovery in Heterogeneous Cellular Networks.

Yu, Yi, et al.; U.S. Appl. No. 13/399,596, filed Feb. 17, 2012; Title: Method and System for Small Cell Discovery in Heterogeneous Cellular Networks.

Office Action dated Mar. 24, 2014; U.S. Appl. No. 13/399,541, filed Feb. 17, 2012; 8 pages.

Office Action dated May 8, 2014; U.S. Appl. No. 13/399,541, filed Feb. 17, 2012; 22 pages.

Office Action dated Oct. 4, 2012; U.S. Appl. No. 13/399,596, filed Feb. 17, 2012; 13 pages.

Final Office Action dated Mar. 7, 2013; U.S. Appl. No. 13/399,596, filed Feb. 17, 2012; 10 pages.

Office Action dated Jun. 20, 2013; U.S. Appl. No. 13/399,596, filed Feb. 17, 2012; 14 pages.

Office Action dated Oct. 3, 2013; U.S. Appl. No. 13/399,596, filed Feb. 17, 2012; 9 pages.

Final Office Action dated Feb. 27, 2014; U.S. Appl. No. 13/399,596, filed Feb. 17, 2012; 11 pages.

Notice of Allowance dated Jun. 4, 2014; U.S. Appl. No. 13/399,596, filed Feb. 17, 2012; 9 pages.

Notice of Allowance dated Jun. 23, 2014; U.S. Appl. No. 13/399,596, filed Feb. 17, 2012; 12 pages.

Office Action dated Nov. 7, 2014; U.S. Appl. No. 13/399,541, filed Feb. 17, 2012; 19 pages.

\* cited by examiner

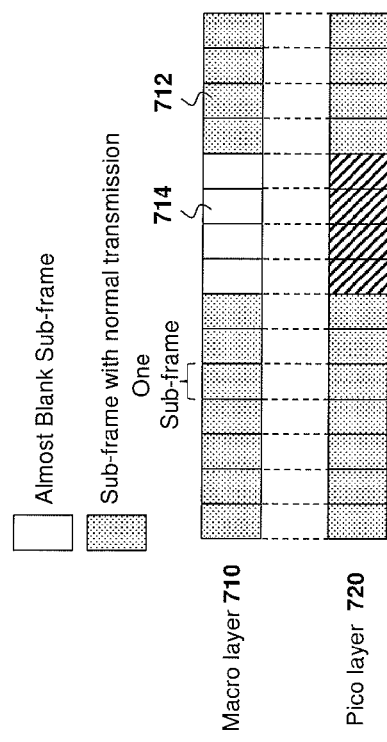
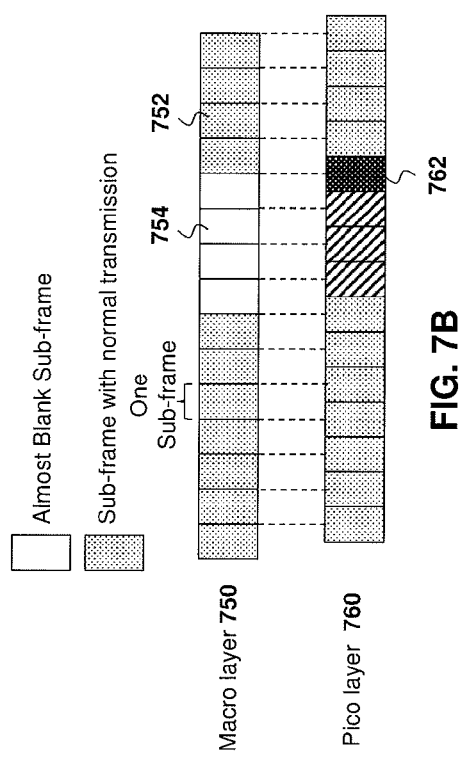
FIG. 7A
FIG. 7B

US 9,008,720 B2

METHOD AND SYSTEM FOR SMALL CELL DISCOVERY IN HETEROGENEOUS CELLULAR NETWORKS

RELATED APPLICATIONS

The present application is a non-provisional of U.S. Provisional Application No. 61/539,333, filed Sep. 26, 2011, the entire contents of which are incorporated herein by reference.

FIELD OF THE DISCLOSURE

The present disclosure relates to heterogeneous networks and in particularly relates to networks having small cells within a macro cell.

BACKGROUND

Various mobile architectures include a macro cell having smaller cells found within these macro cells. One example is the long-term evolution advanced (LTE-A) communication standard in which a user equipment (UE) may communicate with both the macro cell and small cells, such as pico cells or femto cells or relay cells. The use of LTE-A is however not limiting any other similar networks are possible.

In a LTE-A heterogeneous network, pico cells could be deployed with overlaid macro cells. The pico cells could share the same carrier with the macro cell or use different carriers.

In order to connect to a small cell, a UE needs to find the small cell to connect to. This is typically done by scanning for a reference signal for the small cell. However, UE power consumption may be affected by the search for pico cells, especially when the pico cells use a carrier frequency different from that of the macro cells.

Further, delays in transitioning to an available small cell due to the searching process could degrade a user's experience. In particular, to preserve battery life a UE may only periodically search for other cells including pico cells. Thus, the transition to a small cell may be delayed, leading to sub-optimal data throughput for the device.

BRIEF DESCRIPTION OF THE DRAWINGS

The present disclosure will be better understood with reference to the drawings, in which:

FIG. 7A is a block diagram showing transmission of subframes at a macro layer and a pico layer in which the macro layer and pico layer are time synchronized;

FIG. 7B is a block diagram showing transmission of subframes at a macro layer and a pico layer in which the macro layer and pico layer are not time synchronized;

DETAILED DESCRIPTION

Figure 1:
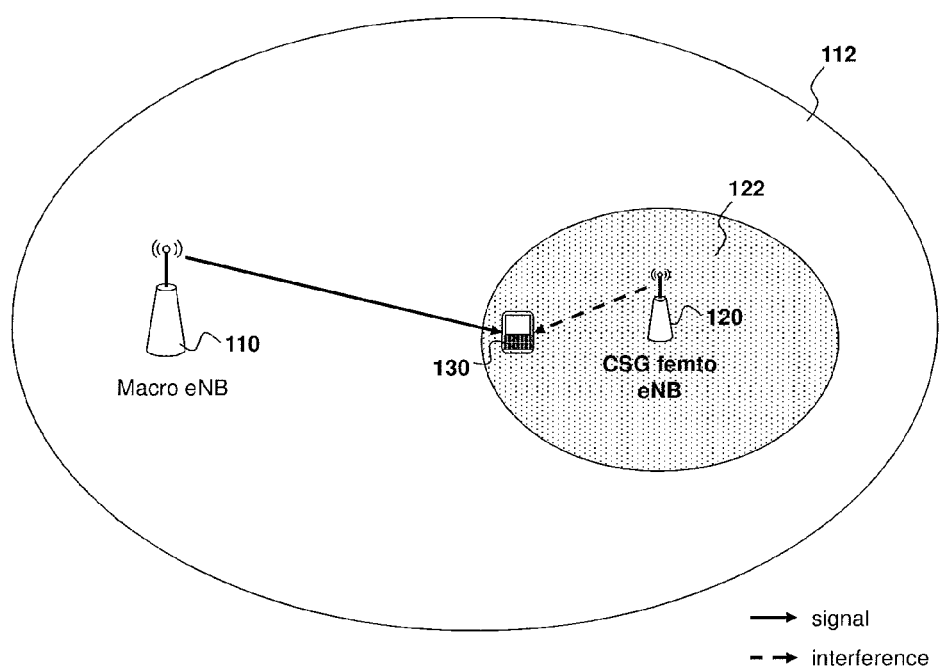
FIG. 1 is a block diagram illustrating a heterogeneous network having a closed subscriber group cell within a macro cell.

The present disclosure provides a method at a user equipment in a network having a macro cell and at least one small cell, the method comprising: receiving a measurement restriction over a broadcast channel from the macro cell; and applying the restriction for a corresponding measurement at the user equipment.

The present disclosure further provides a user equipment configured to operate in a heterogeneous network having a macro cell and at least one small cell, the user equipment comprising: a processor; and a communication subsystem, wherein the processor and communication subsystem cooperate to: receive a measurement restriction over a broadcast channel from the macro cell; and apply the restriction for a corresponding measurement at the user equipment.

The present disclosure further provides a method at a user equipment in a network having a macro cell and at least one small cell, the method comprising: receiving a small cell list from the macro cell; and measuring at least one of a reference signal receive power and a reference signal received quality based on the received small cell list.

The present disclosure further provides a user equipment configured to operate in a heterogeneous network having a macro cell and at least one small cell, the user equipment comprising: a processor; and a communication subsystem, wherein the processor and communication subsystem cooperate to: receive a small cell list from the macro cell; and measure at least one of a reference signal receive power and a reference signal received quality based on the received small cell list.

The present disclosure further provides a method at a user equipment in a network having a macro cell and at least one small cell, the method comprising: receiving a neighboring small cell configurations from the macro cell; and utilizing the received small cell configurations to attach to a small cell.

The present disclosure further provides a user equipment configured to operate in a heterogeneous network having a macro cell and at least one small cell, the user equipment comprising: a processor; and a communication subsystem, wherein the processor and communication subsystem cooperate to: receive a neighboring small cell configurations from the macro cell; and utilize the received small cell configurations to attach to a small cell.

The present disclosure further provides a method at a user equipment in a network having a macro cell and at least one small cell, the method comprising: receiving an s-measure offset value over a broadcast channel from the macro cell; and applying the s-measure offset value to an s-measure for neighbor cell discovery.

The present disclosure further provides a user equipment configured to operate in a heterogeneous network having a macro cell and at least one small cell, the user equipment comprising: a processor; and a communication subsystem, wherein the processor and communication subsystem cooperate to: receive an s-measure offset value over a broadcast channel from the macro cell; and apply the s-measure offset value to an s-measure for neighbor cell discovery.

The present disclosure further provides a method at a user equipment in a network having a macro cell and at least one small cell, the method comprising: receiving an indication over a dedicated connection from the macro cell to activate or deactivate small cell measurements; and activating or deactivating the small cell measurements based on the indication.

The present disclosure further provides a user equipment configured to operate in a heterogeneous network having a macro cell and at least one small cell, the user equipment comprising: a processor; and a communication subsystem, wherein the processor and communication subsystem cooperate to: receive an indication over a dedicated connection from the macro cell to activate or deactivate small cell measurements; and activate or deactivate the small cell measurements based on the indication.

A heterogeneous network is a network which is designed to provide a balance of coverage needs and capacity. It may include macro cells and low-power nodes such as pico cells, femto cells, and relays, among others. The macro cells overlay the low-power nodes or small cells, sharing the same frequency or on different frequencies. In one embodiment, small cells are utilized to offload capacity from macro cells, improve indoor and cell edge performance, among other factors. For example, near a cell edge, a mobile device that connects to a pico cell may have better data throughput than when connecting to the macro cell.

In heterogeneous network deployment, inter-cell interference coordination (ICIC) plays an important role and time domain based resource sharing or coordination has been provided as an enhanced ICIC (eICIC). The eICIC is also known as the Almost Blank Subframe (ABS) based solutions. In such an ABS based solution, a dominant cell will transmit almost no information in a certain subframes.

There are two main deployment scenarios where eICIC is utilized. These include the closed subscriber group (femto cell) scenario and the pico cell scenario.

Reference is now made to FIG. 1, which shows the closed subscriber group scenario. In FIG. 1, macro evolved Node B (eNB) 110 has a cell coverage area shown by circle 112.

Similarly, closed subscriber group (CSG) cell 120 has a coverage area shown by circle 122.

A non-member UE 130 enters into the CSG coverage area 122. However, since UE 130 is not a member of CSG cell 120, UE 130 cannot connect to CSG cell 120 must continue to be served by macro cell 110. In this case, the CSG cell is dominant and has a stronger signal power than that of macro cell 110 and the signals from CSG cell 120 are seen as interference at UE 130.

That is, according to FIG. 1, dominant interference conditions may happen when non-member users are in close proximity of a CSG cell 120. Typically, the Physical Downlink Control Channel (PDCCH) reception at the non-member UE is interfered with by the downlink transmission from the CSG cell 120 to its member UEs. Interference to the PDCCH reception of the macro cell UE 130 has a detrimental impact on both the uplink and downlink data transfer between the UE and the macro eNB 110. In addition, other downlink control channels and reference signals from both the macro eNB 110 and neighbor cells that may be used for cell measurements and radio link monitoring are also interfered with by the downlink transmission from the CSG cell 120 to its member UEs.

Depending on network deployment and strategy, it may not be possible to divert the users suffering from inter-cell interference to another E-UTRA carrier or other radio access technology (RAT). In this case, time domain ICIC may be used to allow such non-member UEs to remain served by the macro cell on the same frequency layer. Such interference may be mitigated by the CSG cell utilizing Almost Blank Subframes (ABS) to protect the protected resources for radio resource measurement (RRM), radio link monitoring (RLM) and Channel State Information (CSI) measurements for the serving macro eNB 110, allowing the UE to continue to be served by the macro eNB under otherwise strong interference from the CSG cell.

Figure 2:
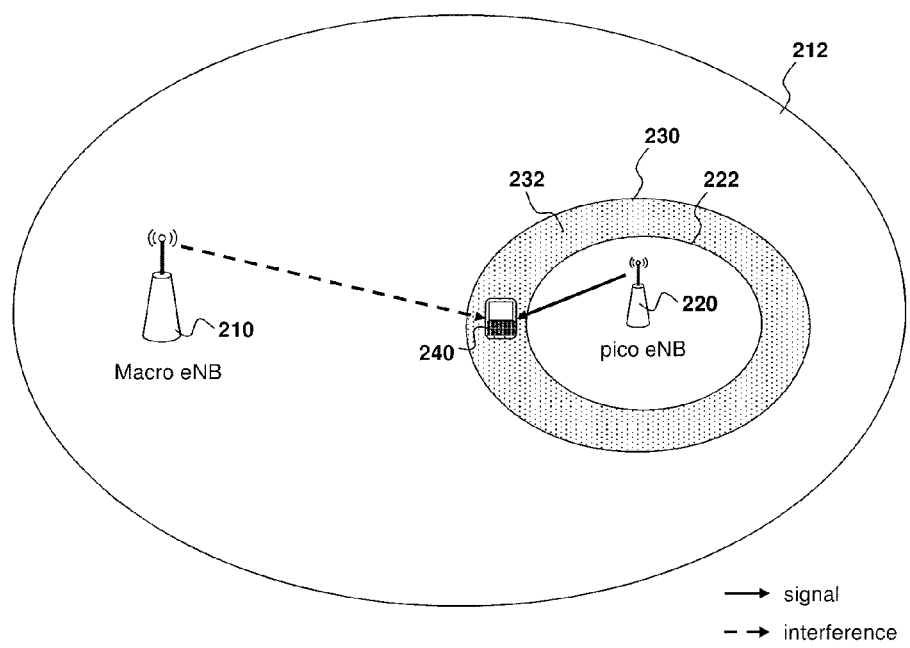
FIG. 2 is a block diagram illustrating a heterogeneous network having a pico cell within a macro cell.

Similarly, for a pico scenario, reference is made to FIG. 2. In FIG. 2, macro eNB 210 has a cell coverage area shown by circle 212. Similarly, a pico cell 220 has a coverage area shown by circle 222. Pico cell 220 may further include a range expansion area 232 used for increasing the coverage area for pico cell 220.

A UE 240 is served by pico cell 220, but it is close to the edge of the pico cell coverage or in range expansion area 232 of the pico cell 220. In this case, macro eNB 210 may generate/cause significant interference for the UE 240.

In particular, the time domain ICIC may be utilized for a pico cell 220, for users who are served in the edge of the serving pico cell. This scenario may be used, for example, for traffic offloading from a macro eNB 210 to the pico cell 220. Typically, the Physical Downlink Control Channel transmitted by the pico cell is interfered by the downlink transmission from the macro cell. In addition, other downlink control channels and reference signals, from both the pico cell 220 and from neighbor pico cells, that may be used for cell measurements and radio link monitoring are also interfered with by the downlink transmission from the macro cell.

Time domain ICIC may be utilized to allow such UEs to remain served by the pico cell 220 at an extended range on the same frequency layer. Such interference may be mitigated by the macro cell using an ABS to protect the corresponding pico cell's subframes from the interference. A UE 240 served by a pico cell 220 uses the protected resources during the macro cell ABS for RRM, RLM and CSI measurements for the serving pico cell and possible for neighboring pico cells.

In both the FIG. 1 and FIG. 2 scenarios, for the ICIC, subframe utilization across different cells are coordinated in time through backhaul signaling or operations, administration and maintenance (OAM) to configuration of the Almost Blank Subframe patterns. The Almost Blank Subframes in an aggressor cell are used to protect resources in subframes in the victim cell receiving strong inter-cell interference from the aggressor cell.

Almost Blank Subframes are subframes with reduced transmit power and having no activity or reduced activity on some physical channels. However, in order to support backward compatibility for UEs, the eNB may still transmit some required physical channels in an ABS, including control channels and physical signals as well as System Information.

Patterns based on ABSs are signaled to the UE to restrict the UE measurement to specific subframes called time domain measurement resource restrictions. There are different patterns depending on the type of measured cell and measurement types.

Figure 3:
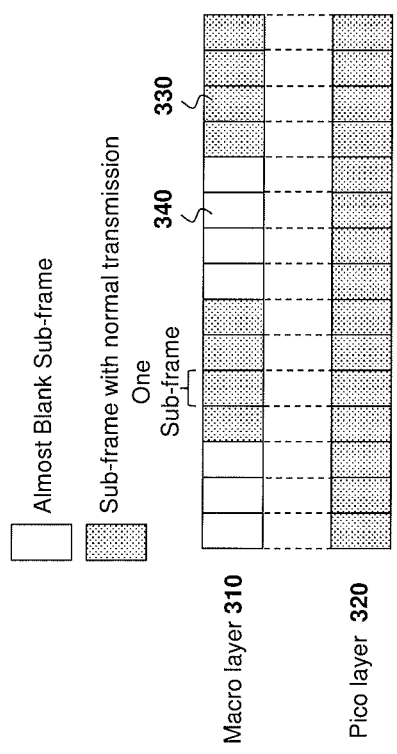
FIG. 3 is a block diagram showing subframe transmission at a macro layer and at a pico layer where the macro layer includes almost blank subframes.

An example of the ABS for pico scenario is shown with regards to FIG. 3. In FIG. 3, the macro layer 310 is the aggressive cell and pico layer 320 is the cell that has been interfered with. As seen in the example of FIG. 3, pico layer 320 transmits subframes with normal transmissions 330, as does macro layer 310. However, macro layer 310 also includes Almost Blank Subframes 340. Pico layer 320 may, when macro layer 310 is transmitting normal frames, schedule only UEs close to the pico cell during these subframes. However, during the Almost Blank Subframes transmissions, the pico layer 320 may transmit to UEs close to the cell edge or in the range expansion area.

Thus, in the example of FIG. 3, the macro eNB configures and transfers the ABS patterns to pico eNB, the macro eNB does not schedule data transmissions in ABS subframes to protect the UEs served by the pico eNB at the edge of the pico cell. The pico eNB may schedule transmission to and from the UEs in the cell center regardless of the ABS patterns because the macro interference is sufficiently low. During the ABS subframes, the pico eNB 320 may schedule transmission to and from the UEs at the edge of the cell.

UEs are generally transitioned to pico or small cells in order to offload traffic from the macro cell and to improve performance to the UE. However, in heterogeneous networks, there are currently no efficient discovery mechanisms for pico cells or small cells specified. As a result, public pico cell discovery requires an exhaustive search. Even when there are pico cells in a macro cell, the pico cells are normally deployed only in some spots. Further, not all the macro cells may have pico cells. Thus, when doing an exhaustive search, the UE must continuously search for pico cells throughout all frequencies, and this results in a considerable drain on the battery life of the UE.

When the UE is in an idle mode, the UE may need to discover the small cells efficiently for camping purposes. In this scenario, no dedicated connection is established and the UE may only rely on broadcast signaling for small cell discovery. In accordance with one embodiment of the present disclosure, the broadcast signaling may include information for such discovery.

When the UE is in the connected mode, the UE could rely on the dedicated measurement configurations to optimize small cell measurements or discovery in accordance with one embodiment. Possible location information or proximity indications could be utilized to further enhance the discovery procedures.

Figure 4:
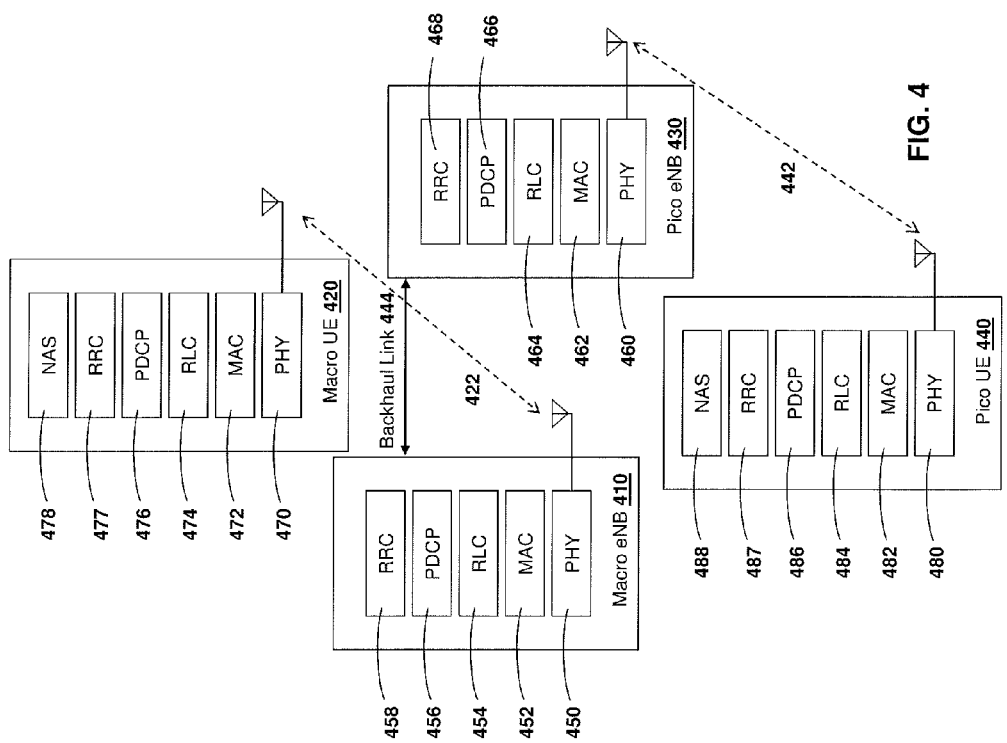
FIG. 4 is a block diagram illustrating communications between the macro eNB and UE and a pico eNB and UE.

Reference is now made to FIG. 4, which shows a simplified architecture for communication between various elements in a system. In particular, a macro eNB 410 provides cell coverage to a macro area and may server a macro UE 420, which communicates with the macro eNB 410 through communication link 422.

Similarly, a pico eNB 430 communicates with a pico UE 440 through a communication link, shown by arrow 442.

In the example of FIG. 4, pico eNB 430 is found within the area served by macro eNB 410.

A wired or wireless backhaul link 444 is used to provide communication and synchronization between the macro eNB 410 and pico eNB 430. In particular, the backhaul link 444 may be used to synchronize the ABS subframes for macro eNB 410.

As shown in the example of FIG. 4, each element includes a protocol stack for the communications with other elements. In the case of macro eNB 410 the macro eNB includes a physical layer 450, a medium access control (MAC) layer 452, a radio link control (RLC) layer 454, a packet data convergence protocol (PDCP) layer 456 and a radio resource control (RRC) layer 458.

Similarly, the pico eNB includes the physical layer 460, MAC layer 462, RLC layer 464, PDCP layer 466 and RRC layer 468.

In the case of macro UE 420, the macro UE includes a physical layer 470, a MAC layer 472, an RLC layer 474, a PDCP layer 476, an RRC layer 477 and a non-access stratum (NAS) layer 478.

Similarly, the pico UE 440 includes the physical layer 480, the MAC layer 482, the RLC layer 484, the PDCP layer 486, the RRC layer 487 and the NAS layer 488.

Communications between the entities, such as between macro eNB 410 and macro UE 420, generally occur within the same protocol layer between the two entities. Thus, for example, communications from the RRC layer at macro eNB 410 travels through the PDCP layer, RLC layer, MAC layer and physical layer and gets sent over the physical layer to macro UE 420. When received at macro UE 420, the communications travel through the physical layer, MAC layer, RLC layer, PDCP layer to the RRC level of macro UE 420. Such communications are generally done utilizing a communications sub-system and a processor, as described in more detail below.

RRC_IDLE

In order to detect a small cell in an efficient manner, more accurate measurement results may be made by adopting a restricted radio resource management (RRM)/radio link management (RLM) measurements in RRC_IDLE mode. This may be done through a broadcast by an eNB, where the broadcast indicates the measurement restriction patterns in system information blocks (SIBs) to restrict the RRM/RLM measurements at the UE.

In one embodiment, a first restriction pattern is signaled for performing RRM/RLM measurements with respect to the serving cell and second restriction patterns are signaled for neighboring cell RRM/RLM measurements. This may be done for both inter-frequency and intra-frequency. Inter-frequency indicates a frequency that is outside the frequency of the serving cell, while inter-frequency indicates a frequency used by the serving cell.

In the Inter-frequency case, there may be one measurement restriction per frequency since there is no interference but the UE may avoid measuring during the neighbor cell ABS. When in idle mode, a UE receives the measurement restrictions and the UE follows such restrictions for RRM/RLM measurements of the serving cell or neighboring cells. Further, a UE may not need to measure a cell that is located some distance away from the UE based on the location of the UE and location information of the cell.

Thus, for example, a UE that is looking for a neighboring cell may be provided with a restriction pattern indicating that the RRM/RLM measurement should not be performed during the subframes indicated by the restriction pattern of the neighboring cells. Referring to FIG. 3, the ABS subframes 340 are shown for macro layer 310 and the restriction pattern may be that the UE does not look for the neighboring cell during such ABS subframes 340 or a subset of such ABS subframes 340.

Figure 5:
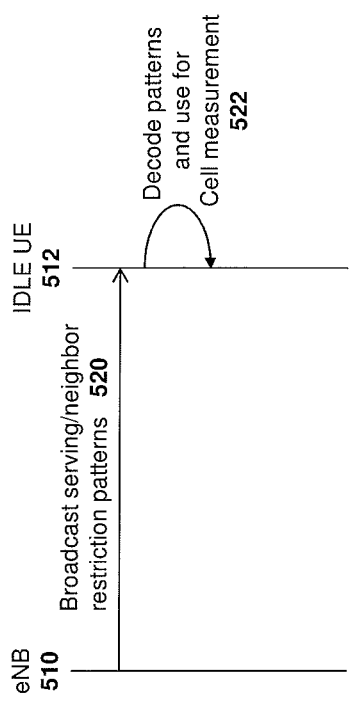
FIG. 5 is a flow diagram illustrating transmission of serving and neighbor restriction patterns from an eNB to a UE.

Thus, referring to FIG. 5, a serving eNB 510 communicates with an idle mode UE 512.

At various intervals serving eNB 510 will broadcast through a broadcast channel the serving cell and neighboring cell restriction patterns, as shown by arrow 520. This broadcast will be received by the various UEs within the cell and UE 512 will then decode the restriction patterns and use the restriction patterns during cell measurements.

Reference is now made to Table 1 below. Table 1 shows one example of an information element that can be used for restriction. In particular, the information element is labeled as MeasSubframePattern.

TABLE 1

MeasSubframePattern information element

```
-- ASN1START
MeasSubframePattern-r11 ::= CHOICE {
    subframePatternFDD-r11      BIT STRING (SIZE (40)),
    subframePatternTDD-r11      CHOICE {
        subframeConfig1-5-r11       BIT STRING (SIZE (20)),
        subframeConfig0-r11         BIT STRING (SIZE (70)),
        subframeConfig6-r11         BIT STRING (SIZE (60)),
        ...
    },
    ...
}
-- ASN1STOP
```

From the above, the information element includes various information, including the subframe pattern for frequency division duplex (FDD). In the example of Table 1 the subframe pattern for the FDD is a bit string having forty bits.

Further, the information element of Table 1 includes a subframe pattern for time division duplex (TDD). The subframe pattern for the TDD includes three bit strings each of varying sizes.

The subframe pattern of the information elements of Table 1 could be utilized for communicating both the serving cell and neighboring cell restriction patterns.

The information elements may be added to various system information blocks (SIBs), depending on whether the pattern is for the serving cell, an intra-frequency cell or an inter-frequency neighboring cell. In each case, the system information block could include an indication to either release the restriction pattern for the UE, or to set up a restriction pattern for the RRM/RLM measurements.

In particular, the Third Generation Partnership Project (3GPP) Technical Specification 36.331, *"Radio Resource Control (RRC): Protocol Specification"* could be modified in accordance with the information elements shown in Appendix A. In particular, a system information block type 3 information element could be utilized for setting a restriction pattern for the serving cell, a system information block type 4 information element could be used for setting a restriction pattern for intra-frequency neighboring cells, and a system information block type 5 information could be used for setting the restriction pattern for inter-frequency carrier neighboring cells. The examples in Appendix A are however not limiting, and other examples of information elements or broadcast messages are possible.

The information broadcast will generally be from an RRC layer of a serving eNB to the RRC layer of a UE. However, the messaging could also be on other layers.

Cell_List for Small Cells

In addition to providing restriction patterns, in one embodiment cell_lists may be provided to allow the UE to determine the searching for neighboring cells. In particular, it is not power efficient for the UE to monitor or search for small cells including pico cells all the time, especially for inter-frequency cases. The UE may continuously have to measure the reference signal receive power (RSRP) on all neighboring frequencies for all possible cell identifiers. This could quickly drain a UE's battery.

In one embodiment, the eNB may therefore provide additional information to allow the UE to perform pico cell or small cell searching procedures more efficiently. In one alternative, the eNB may broadcast the identities of pico cells within the coverage area. In this way, whenever a UE camps on a cell, it is aware of pico cells around and could perform small cell searching procedures only for pico cells within the list.

For example, in the case of an inter-frequency search, if the UE is aware that there are no close-by pico cells on other frequencies, the UE does not need to start the inter-frequency pico cell searching, and this could save the UE's battery power.

In an intra-frequency search, if the UE is aware of the close-by small cell_list, the UE could search for only those cells and thus reduce potential blind detections.

Thus, for both inter-frequency and intra-frequency, the UE could go directly to measure the frequencies provided in the small cell_list instead for using blind detection, which could drain the battery power.

In one embodiment, a system information block could include a small cell_list, which may be a sequence of physical cell ranges. The cell_list could include a plurality of cells depending on the number of pico cells within the macro area.

Further, in one embodiment the cell_list could include a location identifier indicating the location of the pico cell. This location identifier could be used by the UE to further restrict the RSRP measurement for only those pico cells that are in close proximity to the UE. Each UE could implement its own definition of "close proximity" in some embodiments. Therefore, for example, if a UE is within 200 meters of a first pico cell but is more than 400 meters from a second pico cell, the eNB may start to monitor the RSRP for the first pico cell but may ignore the second pico cell. The distances in the above examples are meant for illustrative purposes only and are not limiting. In some embodiments the eNB could also signal some parameters to the UE to determine the "close proximity", for example, within X meters of the pico cell. The value of "X" may be signaled by the eNB.

In the case that the UE cannot determine its own location, the UE may try to measure all cells on the list. This may occur if the UE has no GPS signal or is not equipped with GPS a receiver.

Figure 6:
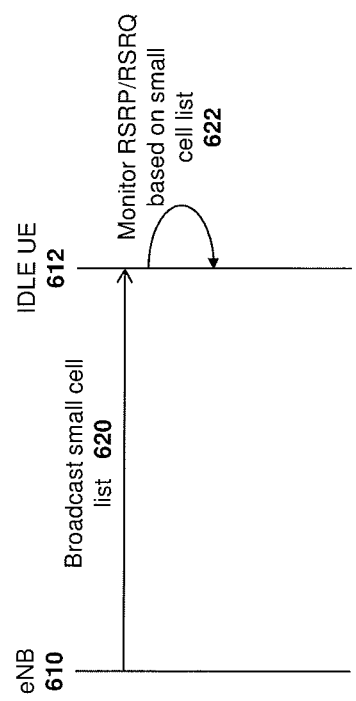
FIG. 6 is flow diagram illustrating transmission of a small cell list from an eNB to a UE.

The cell_list may be provided in accordance with the example of FIG. 6. In the example of FIG. 6, the UE 612 is in idle mode and camped on eNB 610.

eNB 610 broadcasts system information blocks that include a small cell_list and may also include "X". The parameter "X" may be specified for each of the small cells within the surrounding area. This is shown by arrow 620.

On receiving the broadcast with the small cell_list, UE 612 will then monitor the RSRP/RSRQ of the small cells in accordance with the small cell_list. This is shown, for example, by arrow 622 in FIG. 6.

The monitoring of the RSRP/RSRQ at arrow 622 could include monitoring only the frequencies provided in the small cell_list and could also include monitoring only those small cells that are in close proximity to the UE, as described above.

In one embodiment, the 3GPP TS.36.331 System Information Block Type 4 may be used to transmit an intra-frequency small cell_list and the System Information Block Type 5 may be used to transmit an inter-frequency small cell_list. Examples of such information elements for the system information block are shown with regard to Appendix B. The examples of Appendix B are however not limiting, and other broadcast messages containing a small cell list are possible.

The communication of the small cell list is performed, in one embodiment, at the RRC layer of the eNB and the UE. However, in other embodiments other layers within the eNB and UE could be used.

Subframe Offset for Small Cells

In order to apply time domain eICIC techniques, the macro cell and pico cell should be time aligned on a subframe level. Otherwise, interference avoidance through the ABS subframe may not be effectively implemented.

For example, reference is now made to FIGS. 7A and 7B.

In FIG. 7A, a macro layer 710 transmits normal subframes 712 and almost blank subframes 714.

A pico layer 720 is time aligned on the subframe level and therefore includes subframes 722 which may utilize the ABS subframe of macro layer 710 effectively.

Referring to FIG. 7B, macro layer 750 includes normal subframes 752 and almost blank subframes 754. However, pico layer 760 is not time aligned and therefore, as seen in FIG. 7B, subframe 762 overlaps with a normal subframe and therefore is not used effectively.

Thus, in accordance with FIG. 7A, the macro cell and pico cell are time aligned on the subframe level and the pico cell could safely schedule UEs in a range expansion area. These subframes are protected from the dominant interference from the macro cell since the macro cell mutes its transmissions during the subframes.

However, in FIG. 7B, subframe 762 is intended to be protected from the dominant interference but partial dominant interference still exists since the subframes are not aligned. Therefore, subframe 762 cannot be used by UEs in the range expansion area for the pico cell. This is a resource waste since the macro cell intends to mute transmissions in four subframes but the pico cell can only benefit from three subframes due to the misalignment.

Further, in FIG. 7A, the macro cell and pico cell are not necessarily aligned at the radio frame level. In other words, there could be an integer number of subframe offsets between the start of the radio frames from the macro cell and the pico cell. In the examples below, it is assumed that the macro cell and pico cell are aligned on a subframe level but with an "n" subframe offset between the start of the radio frames. In one embodiment, n may be 0, which is a common configuration for LTE TDD systems and also a likely configuration for LTE FDD systems.

If a UE is in the range expansion area of the pico cell, if n is 0 then the UE may not be able to reliably detect the primary synchronization sequence (PSS), secondary synchronization sequence (SSS) or master information block (MIB) information due to dominant interference from the macro cell. Even in ABS subframes, the macro cell may continue to transmit the PSS/SSS/MIB for backward compatibility purposes.

If a subframe offset is utilized between the macro cell and the pico cell, then the interference on the primary synchronization sequence, secondary synchronization sequence and master information block may be avoided for UEs in the range expansion area of the pico cells. However, n=0 is a common configuration for LTE TDD systems.

In one alternatively, the network may signal a value of n to the UE as well as the physical cell identifier (PCI). In this case, the UE may be aware that n=0 for the pico cell as well as the PCI of the pico cell. The UE could directly detect the RSRP or the reference signal received quality (RSRQ) of the pico cell without first detecting the primary synchronization sequence, the secondary synchronization sequence (SSS) and the master information block (MIB).

A cell-specific reference signal (CRS) sequence is defined by:

$$r_{l,n_s}(m) = \frac{1}{\sqrt{2}}(1 - 2 \cdot c(2m)) + j\frac{1}{\sqrt{2}}(1 - 2 \cdot c(2m+1)), \quad (1)$$

$$m = 0, 1, \ldots, 2N_{RB}^{max,DL} - 1$$

where $n_s$ is the slot number within a radio frame and l is the orthogonal frequency division multiplexing (OFDM) symbol number within the slot. The pseudo-random sequence generator which generates c(i) may be initialized with $c_{init}=2^{10} \cdot (7 \cdot (n_s+1)+l+1) \cdot (2 \cdot N_{ID}^{cell})+2 \cdot N_{ID}^{cell}+N_{CP}$ at the start of each OFDM symbol where:

$$N_{CP} = \begin{cases} 1 & \text{for normal } CP \\ 0 & \text{for extended } CP \end{cases} \quad (2)$$

From the above, if the UE is aware that n=0, knows the PCI of the pico cell and the cyclic prefix (CP) type, whether normal or extended, the UE may derive the CRS sequence. Further, actual resource elements that are used to transmit the CRS are only dependent on the value of n and the PCI. Therefore, given n, the PCI and CP type, the UE could directly measure the RSRP and RSRQ of the pico cell without first detecting the PSS/SSS.

In another alternative, only the PCI and the CP type may be signaled. In this case, the UE could blindly detect the slot and subframe boundary since there are only a limited number of possibilities for the CRS sequences based on the slot index and symbol index. Then the UE could measure the RSRP and RSRQ without any ambiguity.

However, the UE may still need information from the MIB for camping purposes. Since dominant interference also exists on the MIB of the pico cell when n=0, this information may be required.

Currently, MIB includes the following information:

TABLE 2

MasterInformationBlock

```
-- ASN1START
MasterInformationBlock ::=      SEQUENCE {
    dl-Bandwidth                ENUMERATED {
                                    n6, n15, n25, n50, n75, n100},
    phich-Config                PHICH-Config,
    systemFrameNumber               BIT STRING (SIZE (8)),
    spare                       BIT STRING (SIZE (10))
}
-- ASN1STOP
```

From Table 2 above, the master information block includes the downlink bandwidth, the configuration information of physical hybrid automatic repeat request (HARQ) indicator channel (PHICH) and the system frame number (SFN).

If the UE can further be signaled with the downlink bandwidth, PHICH configuration and system frame number information of the surrounding pico/small cells the UE could directly measure the RSRP/RSRQ of the pico cell and camp on the pico cell successfully. With this signaled information, done through broadcast signaling, the UE could receive other system information block information reliably.

The system frame number information may need to be detected. Note that even when n is 0, the SFN of the macro cell and SFN of the pico cell are not necessarily aligned. They could be offset by "m" frames, where m is an integer from 0 to 4095. To make sure that the UE is aware of the SFN of the pico cell, m should be signaled to the UE as well in one embodiment. In an alternative embodiment, the absolute SFN information of small cells may be signaled to the UE.

Based on the above, for UEs in RRC_IDLE mode, to resolve the small cell discovery issues when n is 0, the macro cell may broadcast cell identifies of small cells, the CP type of the small cells, the downlink bandwidth of the small cells, the PHICH configuration of the small cell and the SFN offset (m) of the small cell.

In an alternative, the macro cell may broadcast for each pico cell within its coverage a value of n, the cell identity, the CP type and the downlink bandwidth. If n is 0, the PHICH configuration if n is 0, and the SFN offset if n is 0.

Note that if n is not 0, the UE could reliably detect the PSS/SSS/MIB without dominant interference from the macro cell. In a further embodiment, the downlink bandwidth, the PHICH configuration and the SFN offsets could also be broadcast to the UE even when n does not equal 0. In this case, the UE may use the information directly without detecting the PSS/SSS/MIB, which may save UE battery power.

Further, various information such as the CP type of the small cell, the downlink bandwidth of the small cell, the PHICH configuration of the small cell may not be exchanged between the macro eNB and pico eNB over an X2 interface. Therefore, in order to enable the above, the X2 interface may be used to exchange such information utilizing X2AP signaling over the X2 interface, for example. The information may include the CP type of the small cell, the downlink bandwidth of the small cell, the PHICH configuration and the SFN off-set information.

Reference is now made to Table 3, which shows an example of information which may be added to a system information block.

TABLE 3

Offest Information

```
Intra/Inter FreqSmallCellInfo ::=    SEQUENCE {
    physCellId         PhysCellId,
    sf-offset          BIT STRING (SIZE (4))    OPTIONAL, need OR
    cp-type            BOOLEAN                  OPTIONAL, need OR
    dl-Bandwidth       ENUMERATED {
        n6, n15, n25, n50, n75, n100}
                                                OPTIONAL, need OR
    phich-Config       PHICH-Config             OPTIONAL, need OR
    systemFrameNumber-offset BIT STRING (SIZE (12))    OPTIONAL, need
OR
}
```

In the above, the information includes the physical cell ID, the subframe offset, the cyclic prefix type, the downlink bandwidth, the PHICH configuration and the system frame number offset. However, not all of this information is required, as indicated above, and in some instances only one of the above pieces of information may be required. In other embodiments two or more of the physical ID, the subframe offset, the CP type, the downlink bandwidth, the PHICH configuration and the system frame number offset may be provided in an information element.

If the system information blocks from 3GPP TS 36.331 are used, the above information may be provided in System Information Block Type 4 for intra-frequency small cell information and in System Information Block Type 5 for inter-frequency small cell information. Exemplary System Information Block Information Elements For Both Type 4 and Type 5 are provided in Appendix C. Such system information blocks are meant to be illustrative only and are not meant to be limiting.

Again, the offset information may be provided utilizing the RRC layer of the eNB and the UE in one embodiment. However, other protocol layers may be used in other embodiments.

S-Measure Modification

The S-measure provides a threshold for determining when to scan for other cells. Thus, when a UE camps on a cell, the UE may not perform intra-frequency measurements or inter-frequency measurements until the following conditions are met. For intra-frequency measurements, the conditions are: $Srxlev <= S_{IntraSearchP}$ or $Squal <= S_{IntraSearchQ}$; for the inter-frequency measurements, the serving cell fulfills $Srxlev <= S_{nonIntraSearchP}$ or $Squal <= S_{nonIntraSearchQ}$.

The above are known as the S-measure and the parameters (e.g., $S_{IntraSearchP}$, $S_{IntraSearchQ}$, $S_{nonIntraSearchP}$, $S_{nonIntraSearchQ}$) are designed based on homogeneous deployments. Normally only when signal quality of the serving cell becomes bad does the UE starts to search for new cells on the same or different frequencies. This may not be efficient for heterogeneous network deployment. In heterogeneous networks, when the UE is in a range expansion area of a pico cell, the UE may still not perform intra-frequency measurements or inter-frequency measurements since the signal quality of the serving cell is above the threshold.

For offloading purposes of pico cells, a bias may be used to start corresponding measurements of pico cells. The bias may be included in SIB Type 4 and SIB Type 5 messages, even though the signal quality of the serving cell is still acceptable. The UEs could be biased to camp on the pico cells and hence offloading off the macro cell may be achieved.

One embodiment of the present disclosure includes the addition of a new offset value to relax the serving cell S-measurement criteria. The new offset value for either of the intra or inter-frequency cases may be provided in a system information block. Thus, when a UE receives the new offset value, the UE may perform intra-frequency measurements or inter-frequency measurements until the following conditions are met. For intra-frequency, the serving cell meets the following criteria: $Srxlev <= S_{IntraSearchP}+q$-small-intra-P or $Squal <= S_{IntraSearchQ}+q$-small-intra-Q. In some embodiments, q-small-intra-P and q-small-intra-Q may or may not be the same. If they are the same, it could, for example, be simply represented by q-small-intra.

For inter-frequency measurements, the serving cell meets the following criteria: $Srxlev <= S_{nonIntraSearchP}+q$-small-inter-P or $Squal <= S_{nonIntraSearchQ}+q$-small-inter-Q. In one embodiment, q-small-inter-P and q-small-inter-Q may or may not be the same. If they are the same, it could, for example, be simply represented by q-small-inter.

Thus, in accordance with the above, the offset is used to lower the threshold to search for other cells.

Figure 8:
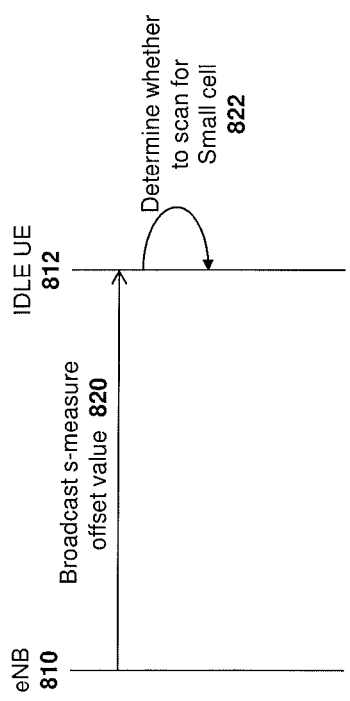
FIG. 8 is a flow diagram illustrating transmission of a S-measure offset value from an eNB to a UE.

Reference is now made to FIG. 8, which shows the signaling. In particular, an eNB 810 communicates through a broadcast channel with a UE 812. eNB 810 provides, in a broadcast message, the offset value, as shown by arrow 820. The UE, upon receiving the off-set value, utilizes the off-set value to determine whether to scan for a pico cell, as shown by arrow 822.

In one embodiment, the off-set may be one of an enumerated list. For example, reference is now made to Table 4.

TABLE 4

| s-measure offset |
| --- |
| q-small-intra / inter    ENUMERATED {<br>dB0, dB1, dB2, dB3, dB4, dB5, dB6, dB8, dB10,<br>dB12, dB14, dB16, dB18, dB20, dB22, dB24},<br>OPTIONAL    -- Need OP |

The example of Table 4 may be applied to either the intra-frequency or inter-frequency cases and in one embodiment both intra and inter-frequency q offsets are provided in a system information block.

In one embodiment, the 3GPP TS 36.331 System Information Block Type 3 may be used to broadcast the off-set value. This is shown, for example, with relation to Appendix D. The example of Appendix D is meant to be exemplary only and is only for illustrative purposes.

Again, the q offset information may be provided utilizing the RRC layer of the eNB and the UE in one embodiment. However, other protocol layers may be used in other embodiments.

RRC CONNECTED

In an RRC_CONNECTED mode, a dedicated connection exists between a UE and an eNB. In this regard, higher level signaling could be used for communication between the two.

When the UE is in the RRC_CONNECTED mode, if the network is signaling a pico cell list within its coverage area, this could help the UE efficiently search for the "right" pico cells to use rather than performing a default search of all possible pico cells, especially for inter-frequency measurements. This could, again, enhance the battery life of the UE.

For example, in one embodiment, the UE operates in macro cell without any pico cells. In this case, the UE does not need to search for any pico cells on different frequencies. Thus, similar to the RRC IDLE solutions, a small cell list may be provided to the UE.

However, since the UE is in the connected mode, the small cell list could be provided through higher layer signaling between the UE and eNB.

Figure 9:
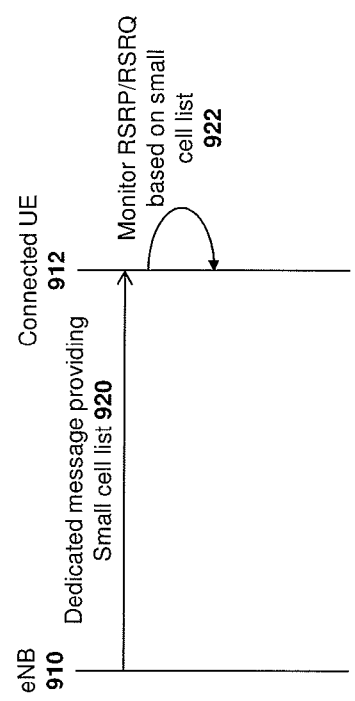
FIG. 9 is a flow diagram illustrating transmission of a dedicated message providing a small cell list from an eNB to a UE.

Reference is now made to FIG. 9. In FIG. 9, an eNB 910 communicates with the connected UE 912. In the embodiment of FIG. 9, a dedicated message may be provided to UE 912 providing the small cell list, as shown by arrow 920. The connected UE 912 can then use this small cell list, as shown by arrow 922 to scan for small cells.

In one embodiment, the small cells may be added to the 3GPP TS 36.311 MeasObjectEUTRA information element (IE) sent from the eNB to the UE. The IE may be used for both the inter-frequency and intra-frequency measurements.

The MeasObjectEUTRA message, as defined in 3GPP TS 36.331 may be modified in accordance with the example of Appendix E. However, Appendix E is only illustrative of one option for the modification of this message. Further, other messages and information elements could be used to provide such information.

The small cell information provided in the message could be similar to the small cell information provided above with regard to the idle mode UE.

In the further embodiment, if the eNB knows the location of the UE, the MeasObjectEUTRA information element may be customized for a particular UE by including only pico cells that are in close proximity to the UE. This would have the effect of having the UE only scan for pico cells when the UE is close to that pico cell. If information regarding a particular pico cell is not contained in the small cell list provided to the UE, the UE would not scan for such a pico cell.

In a further alternative, the MeasObjectEUTRA information element could include all pico cells under the eNB domain, as well as corresponding location information for the pico cells. The UE may then select pico cells to measure based on a comparison between the UE's own location and the provided pico cell location information. If the UE cannot determine its own location, for example if no GPS signals are detected or if the UE does not have the GPS receiver, the UE may try to measure all pico cells listed within the small cell list.

The signaling of the dedicated message between the eNB and UE may, in one embodiment, be done at the RRC layer of the protocol stack. However, the signaling may be performed at other layers in some embodiments.

Subframes Offset for Small Cells

Similar to the idle mode UE solution above, when the UE is in the RRC CONNECTED mode and the subframe offset between the macro cell and pico cells is zero, the UE may have difficulty obtaining the PSS/SSS of the small cells due to the dominant interference from the macro cell. Even in ABS subframes, the macro cell may continue to transmit the PSS/SSS for backward compatibility reasons.

If a subframe offset is utilized between the macro cell and pico cell, the interference on the PSS/SSS may be avoided for UEs in the range expansion area of the pico cells. However, n=0 is a common configuration for LTE TDD systems and also a likely configuration for LTE FDD systems.

Thus, in one embodiment, if the UE can be signaled with the CP type and the cell identity of pico cells, the UE could directly measure the RSRP/RSRQ of the pico cell without first detecting the PSS/SSS. This is similar to the solution described above with regard to an IDLE mode UE.

Further, in the RRC_CONNECTED mode, the PHICH-config and SFN offset may not be needed to be signaled since the macro cell may signal this information to the UE in a handover command message.

The downlink bandwidth is signaled to the UE in a measurement configuration. Therefore, when the UE is in the RRC_CONNECTED mode, in order to resolve the small cell discovery issues when n=0, the macro cell may signal the cell identity of the small cell and the CP type of the small cell through dedicated signaling. In one embodiment the signaling may be done through measurement configurations.

In a further embodiment, the macro cell may signal, for each pico cell within its coverage area, the value of n, the cell identity and the CP type (if n=0). If n~=0, the UE could reliably detect the PSS/SSS without dominant interference from the macro cell.

In yet a further embodiment, the CP type could be signaled to the UE even when n~=0. In this case, the UE may use the information directly for RSRP/RSRQ measurements without detecting the PSS/SSS. This may save battery power on the UE.

In a further alternative, only the PCI and the CP type are signaled, even when n~=0. In this case, the UE could blindly detect the slot and the subframe boundary since there are only a limited number of possibilities for the CRS sequences based on the slot index and symbol index. The UE can then measure the RSRP/RSRQ without any ambiguity.

Figure 10:
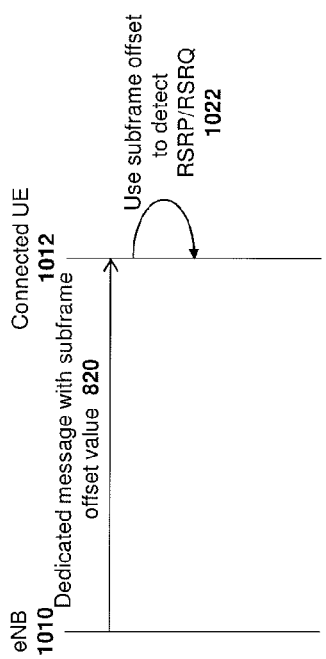
FIG. 10 is a flow diagram illustrating transmission of a dedicated message providing a subframe offset value from an eNB to a UE.

Reference is now made to FIG. 10. In FIG. 10, eNB 1010 communicates with UE 1012. A dedicated message, shown by arrow 1020, is used to provide the subframe offset information to the UE 1012. Such information could include one or more of the physical cell identifier, the subframe offset and the cyclic prefix type.

The UE 1012 then uses such information for small cell detection, as shown by arrow 1022.

In one embodiment, the dedicated message may be a MeasObjectEUTRA information element in accordance with 3GPP TS 36.331. One option for modifying this information element is showed with regard to Appendix F. However, the embodiment of Appendix F is not meant to be limiting and other options are possible.

The signaling of the dedicated message between the eNB and UE may, in one embodiment, be done at the RRC layer of the protocol stack. However, the signaling may be performed at other layers in some embodiments.

Activation/Deactivation of Small Cell Measurements

When a UE enters a macro cell, if the UE immediately starts inter-frequency pico cell searches based on the measurement configurations, this may not be efficient for the battery power consumption since the pico cells may be quite far away from the UE within the macro cell. Further, the coverage of the pico cell may be small, and it may take a long time for the UE to move into the coverage area of the pico cell.

Further, since measurement gap is utilized in the inter-frequency measurements, this could potentially reduce both the DL/UL data throughput for the UE if the inter-frequency measurement is started unnecessarily early. It is therefore more efficient for the UE to start the measurements when the UE is close to the pico cell. One possible way the above may be accomplished is that the network could signal location information of the pico cells to the UEs. The signaling may be done through a dedicated message such as the MeasObjectEUTRA information element of 3GPP TS 36.331. However, other dedicated messaging could also be used.

Hence, UEs with positioning capability such as GPS could use the provided location information for the proximity estimation to determine when to start monitoring for a pico cell.

Figure 11:
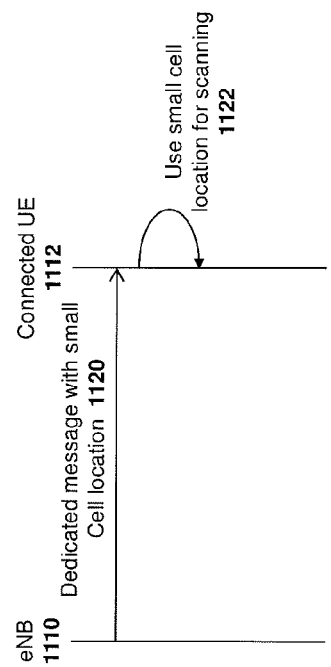
FIG. 11 is a flow diagram illustrating transmission of a dedicated message providing a small cell location from an eNB to a UE.

Reference is now made to FIG. 11. eNB 1110 communicates with UE 1112. The eNB 1110 provides information for the pico or small cells in a dedicated message, as shown by arrow 1120. The UE 1112 may then use the information in message 1120, along with its own GPS coordinates or other positioning coordinates, to determine which pico cells to look for and when to start the measurements, as shown by arrow 1122.

In a further alternative, a UE may request measurement configuration. When the UE detects that it is close to a pico cell, it could request the network to configure the measurements for the corresponding pico cell measurements.

Figure 12:
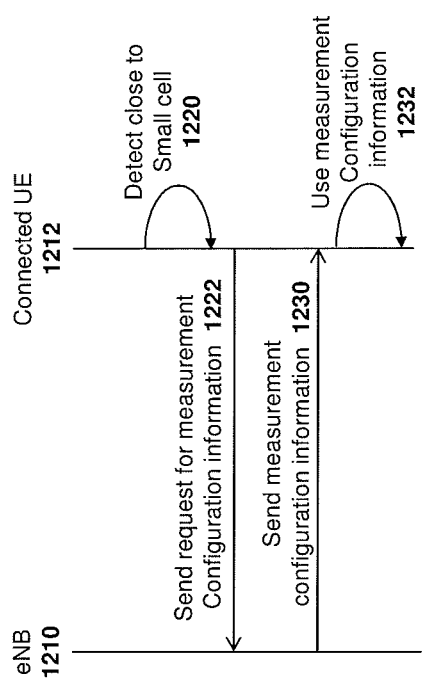
FIG. 12 is a flow diagram illustrating communication between an eNB and a UE for requesting and sending measurement configuration information.

Reference is now made to FIG. 12. In the embodiment of FIG. 12, eNB 1210 communicates with eUE 1212. The eUE 1212 detects as it is close to the pico cell, as shown by arrow 1220. It then sends a message, as shown by arrow 1222, to eNB 1210 to request the measurement configuration for the corresponding pico cell measurements.

In response, eNB 1210 provides the measurement configuration, shown by arrow 1230. The UE 1212 may then use the information received in the message of area 1230 to obtain measurements of the pico cell, as shown by arrow 1232.

In a further alternative, an adaptive measurement may be used. In this alternative embodiment, the UE is configured with the measurements for the pico cells initially (e.g., when the UE first enters the macro cell). However, a flag is added to the measurement configuration to indicate to the UE whether the adaptive measurement is applied.

Thus, if the flag is set to "0", normal measurement procedures similar to Release 8, 9 or 10 of the LTE standards are applied, meaning that the UE starts the measurements immediately following measurement configuration.

If the flag is set to "1", the UE does not need to start the measurement immediately. The UE could delay the start of the corresponding measurements for those cells or frequencies with a flag of set to 1 until the UE is close to the pico cell. The location of the pico cell may be determined either through positioning information or automatic search.

In the adaptive measurement approach above, the network "grants" the right to the UE to determine when to start the measurements with the signaled measurement configuration. In this alternative, indicators are added into a dedicated message, such as the 3GPP TS 36.311 MeasObjectEUTRA information element. The indicator could be one or multiple bits.

If the MeasObjectEUTRA message is used, one option for such message provided with regard to Appendix G. However, this is not meant to be limiting and other dedicated messages could be utilized.

The above therefore provides for UE discovering small cells such as pico cells efficiently in interference limited heterogeneous network environments. The solutions provided above may be used individually or in conjunction with each other and may reduce the battery consumption on the UE as well as reduce cell discovery delay.

In one embodiment, the cell list and its location information may be kept updated, through S1 or X2 interfaces.

The above may be implemented by any network element. A simplified network element is shown with regard to FIG. 13.

Figure 13:
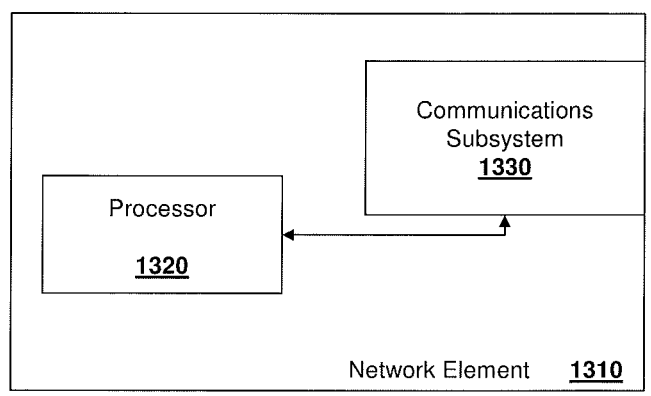
FIG. 13 is a simplified block diagram of a network element capable of being used with the embodiments of the present disclosure.

In FIG. 13, network element 1310 includes a processor 1320 and a communications subsystem 1330, where the processor 1320 and communications subsystem 1330 cooperate to perform the methods described above.

Further, the above may be implemented by any UE. One exemplary device is described below with regard to FIG. 14.

UE 1400 is typically a two-way wireless communication device having voice and data communication capabilities. UE 1400 generally has the capability to communicate with other computer systems on the Internet. Depending on the exact functionality provided, the UE may be referred to as a data messaging device, a two-way pager, a wireless e-mail device, a cellular telephone with data messaging capabilities, a wireless Internet appliance, a wireless device, a mobile device, or a data communication device, as examples.

Where UE 1400 is enabled for two-way communication, it may incorporate a communication subsystem 1411, including both a receiver 1412 and a transmitter 1414, as well as associated components such as one or more antenna elements 1416 and 1418, local oscillators (LOs) 1413, and a processing module such as a digital signal processor (DSP) 1420. As will be apparent to those skilled in the field of communications, the particular design of the communication subsystem 1411 will be dependent upon the communication network in which the device is intended to operate. The radio frequency front end of communication subsystem 1411 can be any of the embodiments described above.

Network access requirements will also vary depending upon the type of network 1419. In some networks network access is associated with a subscriber or user of UE 1400. A UE may require a removable user identity module (RUIM) or a subscriber identity module (SIM) card in order to operate on a CDMA network. The SIM/RUIM interface 1444 is normally similar to a card-slot into which a SIM/RUIM card can be inserted and ejected. The SIM/RUIM card can have memory and hold many key configurations 1451, and other information 1453 such as identification, and subscriber related information.

Figure 14:
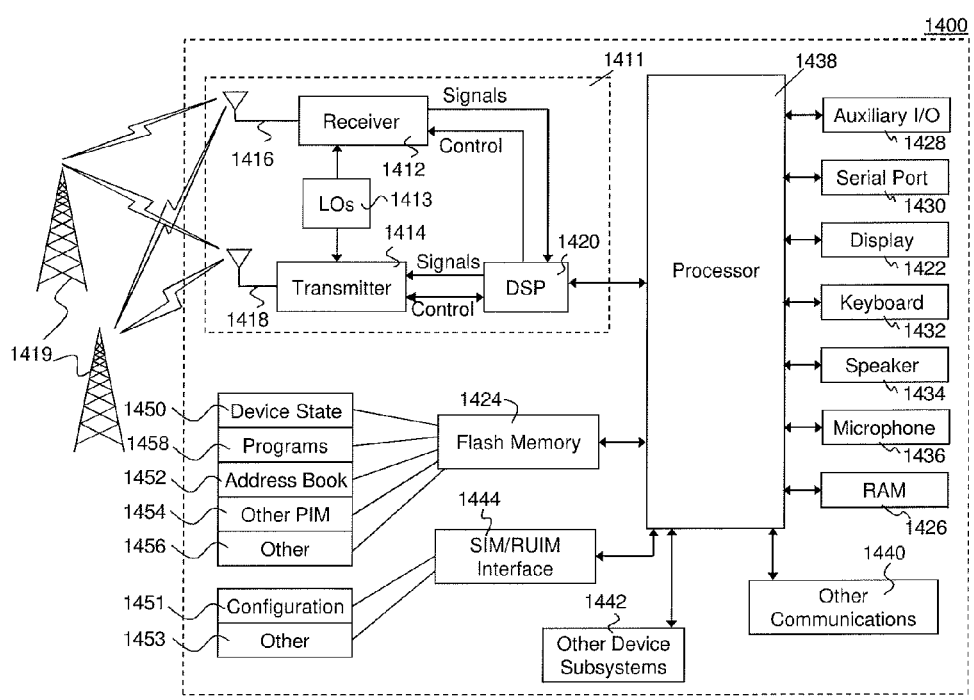
FIG. 14 is a block diagram of an example mobile device.

When required network registration or activation procedures have been completed, UE 1400 may send and receive communication signals over the network 1419. As illustrated in FIG. 14, network 1419 can consist of multiple base stations communicating with the UE.

Signals received by antenna 1416 through communication network 1419 are input to receiver 1412, which may perform such common receiver functions as signal amplification, frequency down conversion, filtering, channel selection and the like. A/D conversion of a received signal allows more complex communication functions such as demodulation and decoding to be performed in the DSP 1420. In a similar manner, signals to be transmitted are processed, including modulation and encoding for example, by DSP 1420 and input to transmitter 1414 for digital to analog conversion, frequency up conversion, filtering, amplification and transmission over the communication network 1419 via antenna 1418. DSP 1420 not only processes communication signals, but also provides for receiver and transmitter control. For example, the gains applied to communication signals in receiver 1412 and transmitter 1414 may be adaptively controlled through automatic gain control algorithms implemented in DSP 1420.

UE 1400 generally includes a processor 1438 which controls the overall operation of the device. Communication functions, including data and voice communications, are performed through communication subsystem 1411. Processor 1438 also interacts with further device subsystems such as the display 1422, flash memory 1424, random access memory (RAM) 1426, auxiliary input/output (I/O) subsystems 1428, serial port 1430, one or more keyboards or keypads 1432, speaker 1434, microphone 1436, other communication subsystem 1440 such as a short-range communications subsystem and any other device subsystems generally designated as 1442. Serial port 1430 could include a USB port or other port known to those in the art.

Some of the subsystems shown in FIG. 14 perform communication-related functions, whereas other subsystems may provide "resident" or on-device functions. Notably, some subsystems, such as keyboard 1432 and display 1422, for example, may be used for both communication-related functions, such as entering a text message for transmission over a communication network, and device-resident functions such as a calculator or task list.

Operating system software used by the processor 1438 may be stored in a persistent store such as flash memory 1424, which may instead be a read-only memory (ROM) or similar storage element (not shown). Those skilled in the art will appreciate that the operating system, specific device applications, or parts thereof, may be temporarily loaded into a volatile memory such as RAM 1426. Received communication signals may also be stored in RAM 1426.

As shown, flash memory 1424 can be segregated into different areas for both computer programs 1458 and program data storage 1450, 1452, 1454 and 1456. These different storage types indicate that each program can allocate a portion of flash memory 1424 for their own data storage requirements. Processor 1438, in addition to its operating system functions, may enable execution of software applications on the UE. A predetermined set of applications that control basic operations, including at least data and voice communication applications for example, will normally be installed on UE 1400 during manufacturing. Other applications could be installed subsequently or dynamically.

Applications and software may be stored on any computer readable storage medium. The computer readable storage medium may be a tangible or in transitory/non-transitory medium such as optical (e.g., CD, DVD, etc.), magnetic (e.g., tape) or other memory known in the art.

One software application may be a personal information manager (PIM) application having the ability to organize and manage data items relating to the user of the UE such as, but not limited to, e-mail, calendar events, voice mails, appointments, and task items. Naturally, one or more memory stores would be available on the UE to facilitate storage of PIM data items. Such PIM application may have the ability to send and receive data items, via the wireless network 1419. Further applications may also be loaded onto the UE 1400 through the network 1419, an auxiliary I/O subsystem 1428, serial port 1430, short-range communications subsystem 1440 or any other suitable subsystem 1442, and installed by a user in the RAM 1426 or a non-volatile store (not shown) for execution by the processor 1438. Such flexibility in application installation increases the functionality of the device and may provide enhanced on-device functions, communication-related functions, or both. For example, secure communication applications may enable electronic commerce functions and other such financial transactions to be performed using the UE 1400.

In a data communication mode, a received signal such as a text message or web page download will be processed by the communication subsystem 1411 and input to the processor 1438, which may further process the received signal for output to the display 1422, or alternatively to an auxiliary I/O device 1428.

A user of UE 1400 may also compose data items such as email messages for example, using the keyboard 1432, which may be a complete alphanumeric keyboard or telephone-type keypad, among others, in conjunction with the display 1422 and possibly an auxiliary I/O device 1428. Such composed items may then be transmitted over a communication network through the communication subsystem 1411.

For voice communications, overall operation of UE 1400 is similar, except that received signals would typically be output to a speaker 1434 and signals for transmission would be generated by a microphone 1436. Alternative voice or audio I/O subsystems, such as a voice message recording subsystem, may also be implemented on UE 1400. Although voice or audio signal output is preferably accomplished primarily through the speaker 1434, display 1422 may also be used to provide an indication of the identity of a calling party, the duration of a voice call, or other voice call related information for example.

Serial port 1430 in FIG. 14 would normally be implemented in a personal digital assistant (PDA)-type UE for which synchronization with a user's desktop computer (not shown) may be desirable, but is an optional device component. Such a port 1430 would enable a user to set preferences through an external device or software application and would extend the capabilities of UE 1400 by providing for information or software downloads to UE 1400 other than through a wireless communication network. The alternate download path may for example be used to load an encryption key onto the device through a direct and thus reliable and trusted connection to thereby enable secure device communication. As will be appreciated by those skilled in the art, serial port 1430 can further be used to connect the UE to a computer to act as a modem.

Other communications subsystems 1440, such as a short-range communications subsystem, is a further optional component which may provide for communication between UE 1400 and different systems or devices, which need not necessarily be similar devices. For example, the subsystem 1440 may include an infrared device and associated circuits and components or a Bluetooth™ communication module to provide for communication with similarly enabled systems and devices. Subsystem 1440 may further include non-cellular communications such as WiFi or WiMAX.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

The invention claimed is:

1. A method at a user equipment in a network having a macro cell and at least one small cell, the method comprising:
   receiving a small cell list from the macro cell;
   when a signal quality level of the macro cell is below a threshold, measuring signals of other macro cells;
   when the signal quality level of the macro cell is below the threshold plus a bias, measuring at least one of a reference signal receive power and a reference signal received quality of the small cells in the received small cell list; and
   connecting to one of the small cells from the small cell list or one of the other macro cells based on said measuring of the signals of the other macro cells and said measuring of the reference signal receive power and the reference signal received quality of the small cells.

2. The method of claim 1, wherein the receiving is over a broadcast channel from the macro cell.

3. The method of claim 2, wherein the small cell list includes at least one of a list of small cells and frequency ranges for each of the small cells in the list.

4. The method of claim 3, wherein the frequency ranges are inter-frequency to the macro cell.

5. The method of claim 4, wherein the small cell list is received on a Third Generation Partnership Project System Information Block Type 5 Information Element.

6. The method of claim 3, wherein the frequency ranges are intra-frequency to the macro cell.

7. The method of claim 6, wherein the small cell list is received on a Third Generation Partnership Project System Information Block Type 4 Information Element.

8. The method of claim 1, wherein the receiving is over a dedicated connection from the macro cell.

9. The method of claim 8, wherein the small cell list is received on a Third Generation Partnership Project MeasObjectUTRA Information Element.

10. The method of claim 1, wherein the small cell list further includes a location for each small cell in the list.

11. The method of claim 10, wherein the user equipment only monitors small cells in close proximity to the user equipment.

12. A user equipment configured to operate in a heterogeneous network having a macro cell and at least one small cell, the user equipment comprising:
   a processor; and
   a communication subsystem,
   wherein the processor and communication subsystem cooperate to:
   receive a small cell list from the macro cell;
   when a signal quality level of the macro cell is below a threshold, measure a signal of other macro cells;
   when the signal quality level of the macro cell is below the threshold plus a bias, measure at least one of a reference signal receive power and a reference signal received quality of the small cells in the received small cell list; and
   connect to one of the small cells from the small cell list or one of the other macro cells based on said measuring of the signals of the other macro cells and said measuring of the reference signal receive power and the reference signal received quality of the small cells.

13. The user equipment of claim 12, wherein the processor and communication subsystem cooperate to receive over a broadcast channel from the macro cell.

14. The user equipment of claim 13, wherein the small cell list includes at least one of a list of small cells and frequency ranges for each of the small cells in the list.

15. The user equipment of claim 14, wherein the frequency ranges are inter-frequency to the macro cell.

16. The user equipment of claim 15, wherein the small cell list is received on a Third Generation Partnership Project System Information Block Type 5 Information Element.

17. The user equipment of claim 14, wherein the frequency ranges are intra-frequency to the macro cell.

18. The user equipment of claim 17, wherein the small cell list is received on a Third Generation Partnership Project System Information Block Type 4 Information Element.

19. The user equipment of claim 12, wherein the processor and communication subsystem cooperate to receive over a dedicated connection from the macro cell.

20. The user equipment of claim 19, wherein the small cell list is received on a Third Generation Partnership Project MeasObjectUTRA Information Element.

21. The user equipment of claim 12, wherein the small cell list further includes a location for each small cell in the list.

22. The user equipment of claim 21, wherein the user equipment only monitors small cells in close proximity to the user equipment.

* * * * *